US012759069B2

(12) United States Patent
Green et al.

(10) Patent No.: US 12,759,069 B2
(45) Date of Patent: Oct. 13, 2026

(54) ADAPTER TO COUPLE A WIRE TO A SOLDER JOINT

(71) Applicant: II-VI Delaware, Inc., Wilmington, DE (US)

(72) Inventors: Eric Green, Wilmington, DE (US); Gregory Chilson, Wilmington, DE (US); Scott Dahl, Wilmington, DE (US)

(73) Assignee: II-VI DELAWARE, INC., Wilmington, DE (US)

(*) Notice: Subject to any disclaimer, the term of this patent is extended or adjusted under 35 U.S.C. 154(b) by 336 days.

(21) Appl. No.: 18/396,982

(22) Filed: Dec. 27, 2023

(65) Prior Publication Data

US 2025/0214167 A1 Jul. 3, 2025

(51) Int. Cl.
*B23K 3/08* (2006.01)

(52) U.S. Cl.
CPC .................................... *B23K 3/087* (2013.01)

(58) Field of Classification Search
CPC ........... B23K 3/087; H01R 4/32; H01R 4/023
See application file for complete search history.

(56) References Cited

U.S. PATENT DOCUMENTS 1,899,254 A * 2/1933 Bear ...................... H01R 4/023 439/865
2,094,404 A * 9/1937 Jackson ................... H01R 4/32 439/801
2,397,052 A * 3/1946 Schietinger ............ B23K 3/087 219/85.14
2,752,583 A * 6/1956 Tracy ................... H01R 11/281 439/789
3,340,497 A * 9/1967 Balint ...................... H01R 9/16 439/907
3,874,767 A * 4/1975 Kennedy ................ H02B 1/056 439/620.08
4,213,669 A * 7/1980 Wittes ...................... H01R 4/36 439/811
4,934,948 A * 6/1990 Mune ..................... H01H 71/08 439/907
5,291,376 A * 3/1994 Mills .................... H01R 12/515 361/752
5,533,913 A * 7/1996 Boehm .................... H01R 4/36 439/810
5,769,656 A * 6/1998 Bamburg ................. H01R 4/56 439/888
5,877,472 A * 3/1999 Campbell .............. H01R 4/029 219/121.64
6,302,709 B1 * 10/2001 Ross ...................... H01R 12/53 439/907
7,766,673 B1 * 8/2010 Dumont ............. H01R 13/5045 439/907
11,791,571 B2 * 10/2023 Maupin .............. H01R 13/5202 439/271
2008/0233807 A1 * 9/2008 Newton ............... H01R 13/745 439/709
2010/0081341 A1 * 4/2010 Wu ........................ H05K 1/182 439/709

(Continued)

*Primary Examiner* — Truc T Nguyen
(74) *Attorney, Agent, or Firm* — McAndrews Held & Malloy, Ltd.

(57) ABSTRACT

Embodiments of the present disclosure may comprise an adapter to couple a wire to a solder joint, with the adapter comprising a solder joint receiving hole and a wire attachment terminal.

13 Claims, 2 Drawing Sheets

(56) References Cited

U.S. PATENT DOCUMENTS

| | | | | |
|---|---|---|---|---|
| 2013/0023165 | A1* | 1/2013 | Sasahara .................. | H01R 4/34<br>439/805 |
| 2013/0280965 | A1* | 10/2013 | Kojyo ................... | F16B 35/045<br>411/389 |
| 2014/0087599 | A1* | 3/2014 | Schumacher ............ | H01R 4/44<br>439/801 |
| 2015/0288081 | A1* | 10/2015 | Bean ...................... | H01R 12/53<br>439/82 |
| 2019/0267728 | A1* | 8/2019 | Mathews ................. | H01R 4/64 |

* cited by examiner

ADAPTER TO COUPLE A WIRE TO A SOLDER JOINT

TECHNICAL FIELD

The present disclosure generally relates to an adapter to couple a wire to a solder joint.

BACKGROUND

Aspects of the present disclosure relate to an adapter to couple a wire to a solder joint. Various issues may exist with conventional solutions for adapters to couple a wire to a solder joint. In this regard, conventional systems and methods for an adapter to couple a wire to a solder joint may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY OF THE DISCLOSURE

Shown in and/or described in connection with at least one of the figures, and set forth more completely in the claims is an adapter to couple a wire to a solder joint.

These and other advantages, aspects and novel features of the present disclosure, as well as details of illustrated embodiments thereof, will be more fully understood from the following description and drawings.

BRIEF DESCRIPTION OF THE DRAWINGS

The various features and advantages of the present disclosure may be more readily understood with reference to the following detailed description taken in conjunction with the accompanying drawings, wherein like reference numerals designate like structural elements.

DESCRIPTION

Figure 1:
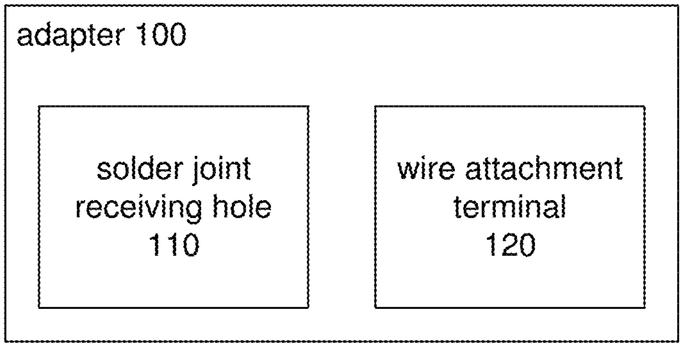
FIG. 1 is a block diagram illustrating an adapter, according to some embodiments of the present disclosure.

The following discussion provides various examples of an adapter to couple a wire to a solder joint. Such examples are non-limiting, and the scope of the appended claims should not be limited to the particular examples disclosed. In the following discussion, the terms "exemplary", "example" and "e.g." are non-limiting.

The figures illustrate the general manner of construction, and descriptions and details of well-known features and techniques may be omitted to avoid unnecessarily obscuring the present disclosure. In addition, elements in the drawing figures are not necessarily drawn to scale. For example, the dimensions of some of the elements in the figures may be exaggerated relative to other elements to help improve understanding of the examples discussed in the present disclosure. The same reference numerals in different figures denote the same elements.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "comprises," "comprising," "includes," and/or "including," are "open ended" terms and specify the presence of stated features, but do not preclude the presence or addition of one or more other features.

The terms "first," "second," etc. may be used herein to describe various elements, and these elements should not be limited by these terms. These terms are only used to distinguish one element from another. Thus, for example, a first element discussed in this disclosure could be termed a second element without departing from the teachings of the present disclosure.

Unless specified otherwise, the term "coupled" may be used to describe two elements directly contacting each other or describe two elements indirectly connected by one or more other elements. For example, if element A is coupled to element B, then element A can be directly contacting element B or indirectly connected to element B by an intervening element C. Similarly, the terms "over" or "on" may be used to describe two elements directly contacting each other or describe two elements indirectly connected by one or more other elements.

Referring now to FIG. 1, there is shown a block diagram that describes an adapter 100, according to some exemplary embodiments of the present disclosure. In some embodiments, the adapter 100 may include a solder joint receiving hole 110 and a wire attachment terminal 120. In some embodiments, the solder joint receiving hole 110 may be operable to receive the solder joint. In some embodiments, the solder joint may be a pin or a peg. In some embodiments, the solder joint may be cylindrical, cuboid, or a prism shape. The prism may be triangular, pentagonal, hexagonal, pentagrammic, or octagonal.

In some embodiments, the solder joint may be a cone, a truncated cone, a triangular prism, or a pyramid shape. The pyramid shape may be triangular, square, hexagonal, or octagonal. In some embodiments, the solder joint may be made of a material with good thermal and electrical conductivity. In some embodiments, the solder joint may be made from copper, brass, bronze, silver, gold, aluminum, nickel, tin, tin alloy, lead or lead alloy.

In some embodiments, the wire attachment terminal 120 may be a threaded hole or a threaded cavity located within the adapter 100. In some embodiments, the wire attachment terminal 120 may be tube-shaped or pipe-shaped, comprising a round, rectangular, square, or oval cross-section. In some embodiments, the wire attachment terminal 120 may be made of a material suitable for soldering. In some embodiments, the wire attachment terminal 120 may include an air-escape hole. In some embodiments, the wire attachment terminal 120 may be operable to form a crimp upon crimping.

In some embodiments, the adapter may be at least partly made of a material with good electrical conductivity.

Figure 2:
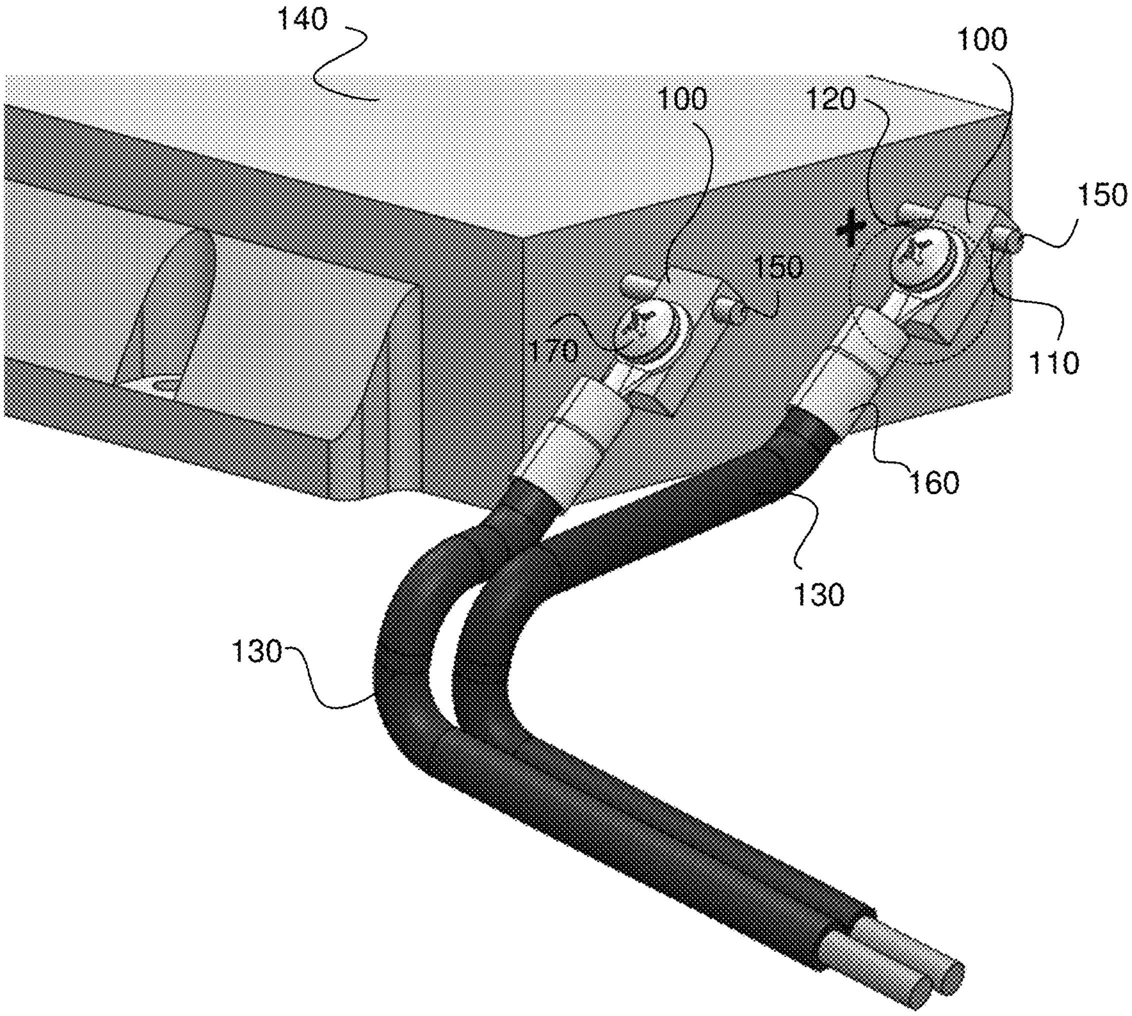
FIG. 2 shows an exemplary embodiment of an adapter in accordance with various aspects of the disclosure.

FIG. 2 shows an exemplary embodiment of an adapter in accordance with various aspects of the disclosure. There is shown adapters 100 comprising a solder joint receiving hole

110 and a wire attachment terminal 120. There is further shown wires 130, a component 140, and solder joints 150. There is also shown a screw 170 and a crimping connector 160.

The adapter 100 may be operable to couple a wire 130 to a solder joint 150. The solder joint receiving hole 110 may be operable to receive a solder joint 150. The wire attachment terminal 120 may be operable to couple a wire 130 to the adapter 100.

The crimping connector 160 may be operable to couple a wire 130 to a ring terminal that may be attached to the adapter 100 using the screw 170. The adapter 100 may be electrically conductive to permit coupling between wire 130 and solder joint 150.

In many instances, it may be advantageous to provide a detachable coupling between a wire 130 and a component 140. As illustrated in FIG. 2, for example, a detachable coupling may be provided by affixing the wire 130 to a crimping connector 160. The crimping connector 160 may comprise, for example, a ring terminal. Using the screw 170, the ring terminal of crimping connector 160 may be screwed to the adapter 100. The solder joint receiving hole 110 may be soldered to the solder joint 150.

In some instances, the component 140 may not be suitable to comprise threaded holes directly and thus soldering pins 150 may be present, as illustrated. This may be the case when generating the threaded holes might crack the material of component 140. Also, in some instances, tightening a screw 170 in a threaded hole of component 140 may apply excess pressure and also lead to a cracked component 140.

Figure 3:
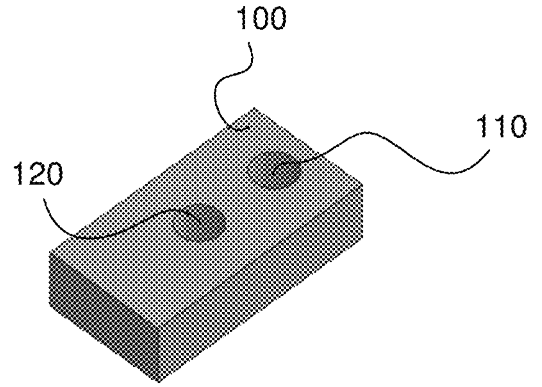
FIG. 3 shows an exemplary embodiment of an adapter in accordance with various aspects of the disclosure.

FIG. 3 shows an exemplary embodiment of adapter 100 in accordance with various aspects of the disclosure. There is shown adapter 100, comprising a solder joint receiving hole 110 and a wire attachment terminal 120. The wire attachment terminal 120 may be a threaded hole or a threaded cavity in adapter 100 that may receive a screw 170 (not shown), for example. FIG. 3 is similar to the adapter 100 shown in FIG. 2, with the solder joint receiving hole 110 arranged differently, at substantially a right angle to the solder joint hole receiving hole 110 illustrated in FIG. 2.

Figure 4:
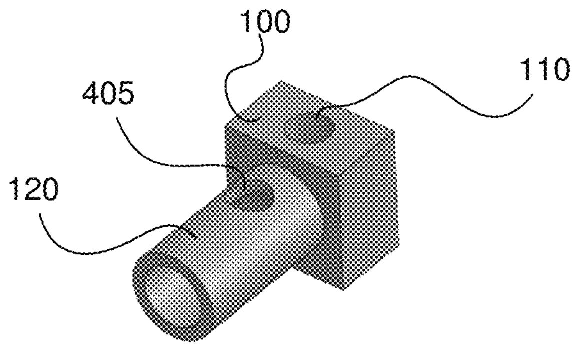
FIG. 4 shows an exemplary embodiment of an adapter in accordance with various aspects of the disclosure.

FIG. 4 shows an exemplary embodiment of adapter 100 in accordance with various aspects of the disclosure. There is shown adapter 100, comprising a solder joint receiving hole 110 and a wire attachment terminal 120. In accordance with various embodiments of the disclosure, the wire attachment terminal 120 may be of a tubular shape, suitable to receive a wire 130. A wire 130 may be attached to the wire attachment terminal 120 by soldering. The wire attachment terminal 120 may comprise an air-escape hole 405. The air escape hole 405 may be operable to permit air to escape during the soldering process, thereby avoiding air enclosures.

Figure 5:
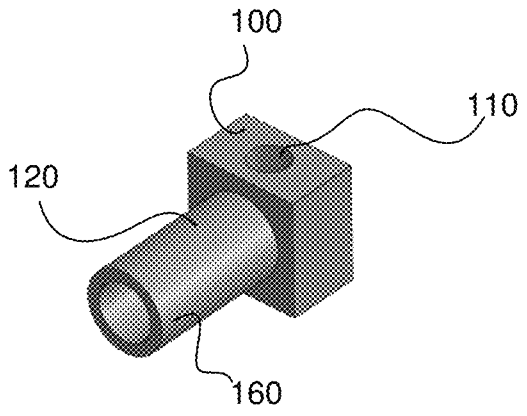
FIG. 5 shows an exemplary embodiment of an adapter in accordance with various aspects of the disclosure.

FIG. 5 shows an exemplary embodiment of adapter 100 in accordance with various aspects of the disclosure. There is shown adapter 100, comprising a solder joint receiving hole 110 and a wire attachment terminal 120. In accordance with various embodiments of the disclosure, the wire attachment terminal 120 may be of a tubular shape, suitable to receive a wire 130 and comprising a crimping connector 160. The wire 130 may be attached to the wire attachment 120 by crimping to form a crimp connection.

The present disclosure includes reference to certain examples, however, it will be understood by those skilled in the art that various changes may be made and equivalents may be substituted without departing from the scope of the disclosure. In addition, modifications may be made to the disclosed examples without departing from the scope of the present disclosure. Therefore, it is intended that the present disclosure not be limited to the examples disclosed, but that the disclosure will include all examples falling within the scope of the appended claims.

What is claimed is:

1. An adapter to couple a wire to a solder joint, said adapter comprising a solder joint receiving hole configured as a blind or through-hole cavity dimensioned to receive and mechanically retain the solder joint; and a wire attachment terminal comprising a threaded cavity intersecting said solder joint receiving hole such that a wire is securable to the adapter independently of the solder joint.

2. The adapter of claim 1, wherein said solder joint receiving hole is operable to receive said solder joint.

3. The adapter of claim 1, wherein said solder joint is a pin or a peg.

4. The adapter of claim 1, wherein said solder joint is cylindrical, cuboid, or a prism shape, and wherein said prism is triangular, pentagonal, hexagonal, pentagrammic, or octagonal.

5. The adapter of claim 1, wherein said solder joint is a cone, a truncated cone, a triangular prism, or a pyramid shape, and wherein said pyramid shape is triangular, square, hexagonal, or octagonal.

6. The adapter of claim 1, wherein said solder joint is made of a material with good thermal and electrical conductivity.

7. The adapter of claim 1, wherein said solder joint is made from copper, brass, bronze, silver, gold, aluminum, nickel, tin, tin alloy, lead or lead alloy.

8. The adapter of claim 1, wherein said wire attachment terminal is a threaded hole or a threaded cavity located within said adapter.

9. The adapter of claim 1, wherein said wire attachment terminal is tube-shaped or pipe-shaped, comprising a round, rectangular, square, or oval cross-section.

10. The adapter of claim 9, wherein said wire attachment terminal is made of a material suitable for soldering.

11. The adapter of claim 10, wherein said wire attachment terminal comprises an air-escape hole.

12. The adapter of claim 1, wherein said wire attachment terminal is operable to form a crimp upon crimping.

13. The adapter of claim 1, wherein said adapter is at least partly made of a material with good electrical conductivity.

* * * * *